United States Patent [19]

Constantin et al.

[11] Patent Number: 4,682,868
[45] Date of Patent: Jul. 28, 1987

[54] THERMAL MANAGEMENT SYSTEM FOR AN EPISCOPIC IMAGE PROJECTOR

[75] Inventors: Emile J. Constantin, Chicago; Stephen Gryglas, Long Grove, both of Ill.

[73] Assignee: Constantin Systems, Inc., Chicago, Ill.

[21] Appl. No.: 739,828

[22] Filed: May 31, 1985

[51] Int. Cl.⁴ ............................................. G03B 21/06
[52] U.S. Cl. ...................................... 353/58; 353/61; 353/119; 353/66
[58] Field of Search ....................... 353/65, 66, 67, 52, 353/56, 57, 58-61, 119

[56] References Cited

U.S. PATENT DOCUMENTS

| | | |
|---|---|---|
| 1,699,078 | 1/1929 | Readeker . |
| 1,989,336 | 1/1935 | Pollard . |
| 2,395,561 | 2/1946 | Osterberg et al. . |
| 2,710,911 | 6/1955 | Krauskopf . |
| 2,818,771 | 1/1958 | Armbruster . |
| 2,837,965 | 6/1958 | Goldsmith .................. 353/52 X |
| 3,628,601 | 12/1971 | Snaper et al. . |
| 3,762,814 | 10/1973 | Kitch . |
| 3,858,971 | 1/1975 | Studley . |
| 4,468,105 | 8/1984 | Montgomery . |

FOREIGN PATENT DOCUMENTS

| | | | |
|---|---|---|---|
| 312501 | 5/1929 | United Kingdom ................... | 353/65 |
| 322726 | 12/1929 | United Kingdom ................... | 353/52 |
| 837830 | 6/1960 | United Kingdom ................... | 353/52 |

*Primary Examiner*—Harry N. Haroian
*Attorney, Agent, or Firm*—Willian Brinks Olds

[57] ABSTRACT

A thermal management system particularly adapted for a portable lightweight opaque projector dissipates the heat generated within the projector by the projector light source in a controlled fashion, while maintaining the exterior of the projector in a moderate temperature range. Opposed sidewalls of the enclosed interior illumination chamber of the projector are provided with alongated planar heat sink surfaces which are coated with a flat black finish which is highly absorptive of infrared as well as visible radiation. The heat sink surfaces are mounted spaced from the adjacent interior sidewall of the projector, such that an air channel or plenum is formed between the heat sinks and the adjacent sidewall. Exhaust fans draw air out from the interior of the projector and through these air channels to thereby remove heat absorbed by the heat sinks. The exterior sidewalls of the projector opposite the heat sinks are provided with a passive heat dissipation mechanism. This takes the form of a plastic outer panel which overlies the outboard side of each of the aforementioned opposed sidewalls. The plastic outer panel defines a plurality of vertical air spaces or channels between the plastic panel and the adjacent sidewall of the projector. Air convection through these air channels cools these sidewalls, with the plastic panels further providing thermal insulation. Yet a third heat dissipation mechanism is provided for deflecting as well as absorbing heat in the area of the fans, which overlie the light source. Objectionable heat transfer from the light source to the fans is thus eliminated.

14 Claims, 4 Drawing Figures

THERMAL MANAGEMENT SYSTEM FOR AN EPISCOPIC IMAGE PROJECTOR

FIELD OF THE INVENTION

This invention generally relates to episcopic image projection systems, i.e. projection systems which reflect light from an illuminated opaque surface onto a screen. It particularly relates to a system for controlling and dissipating the heat generated by the light source used in such a projection system.

BACKGROUND OF THE INVENTION

Episcopic image projection systems are distinguished from diascopic image projection systems in which light passes through a graphic sheet for projection onto a screen. Because light in the episcopic system does not have to pass through the graphic sheet, opaque materials rather than transparent graphics can be used in projecting an image. For this reason, episcopic image projection systems are commonly referred to as opaque projectors.

Opaque projectors have the inherent advantage that plain paper graphics, and even three-dimensional objects, can be projected without any special preparation or special materials. This, of course, eliminates the time and expense needed to prepare transparencies which are required in diascopic image systems.

Attempts have been made to produce a compact, lightweight opaque projector which is capable of achieving excellent optical results. One such successful attempt is disclosed in the patent to Montgomery, U.S. Pat. No. 4,468,105, which is assigned to the assignee herein. The '105 projector is compact and portable, enabling it to be readily stored and transported. It is relatively uncomplicated to assemble and use.

An improvement on this opaque projector is disclosed in pending U.S. pat. app. Ser. No. 704,398, filed Feb. 22, 1985, also assigned to the assignee herein. That application is particularly directed to an improved assembly for more stable mounting of the reflecting mirror used in the projector, which further serves to minimize the size of the mirror used as well as to improve the quality of the projected image. The disclosure of pending U.S. pat. app. Ser. No. 704,398 is hereby incorporated in this application by reference, as if specifically set forth herein.

The present invention reflects yet a further improvement upon the type of lightweight, portable and compact opaque projector shown in the foregoing patent disclosures. The particular problem addressed by the present invention is an improvement in the manner of dissipating, in a controlled fashion, the intense heat generated within the illumination chamber in the interior of the opaque projector, while maintaining the exterior of the projector at moderate temperatures, i.e., not uncomfortable to the touch.

In order to achieve a bright projected image in an opaque projector, which relies upon reflected rather than transmitted light, it is typically necessary to use an extremely bright light source to illuminate the opaque graphic, such as a plurality of high intensity lamps. Such lamps ordinarily provide considerable infrared as well as visible light radiation, and a significant portion of this radiation is absorbed by the interior housing of the projector which surrounds the illumination chamber. Heat is also generated by resistance heating of the lamps themselves. Heat absorption by the interior of the projector is aggravated by the fact that light and heat-absorptive coatings, e.g. black surfaces, are typically used on the interior of the projector to minimize stray light reflections that could distort the projected image, or spill into the room in which the projector is being used thereby creating undesirable stray illumination.

Adequate ventilation of the interior of the projector must therefore be provided to prevent undesirable heating of the projector, which could render it uncomfortable to the touch, as well as shorten the useful life of its components. A large movement of air through the illumination chamber can be provided to carry away the excess heat, but there are problems with such a solution, particularly where a compact opaque projector is involved. For example, vigorous air currents can cause the target graphic to be blown about the interior of the projector, or otherwise disturbed during display, requiring some means to anchor the graphic, such as placing it under a sheet of glass. This of course adds complexity to the use of the projector, restricts use of three-dimensional objects and further detracts from portability by adding weight.

It is also known to utilize a cooling air plenum adjacent the exterior surface of an optical projector for conducting a flow of cooling air around the projector. Such prior art air plenum systems are not readily adaptable to a lightweight portable opaque projector of the type under consideration herein, however.

SUMMARY OF THE INVENTION

It is a principal objective of this invention to provide an improved thermal management system for a portable, compact opaque projector which dissipates, in a controlled fashion, heat generated in the projector by the projector light source, and thereby maintains the exterior of the projector in a moderate temperature range which is not unpleasant to the touch.

This objective is achieved in the present invention through the provision of heat sinks within the interior illumination chamber of the projector which absorb heat energy generated by the projector light source. In a present embodiment, the heat sinks are in the form of two thin, elongated metal panels which are mounted on opposed front and back inner sidewalls of the projector illumination chamber. Each heat sink panel has a front side which faces the illumination chamber, and a back side which is spaced from the inner sidewall of the projector. This spacing provides an air channel, or air plenum, between the heat sink back side and the adjacent inner sidewall.

The inboard facing sides of the heat sink panels are provided with a flat black, anodized finish which is highly absorptive of infrared and visible radiation. The lateral interior sidewalls of the illumination chamber (i.e., the sidewalls extending between the front and back sidewalls) may then be formed of thin single sheets of metal provided with a finish which reflects stray light back into the illumination chamber for absorption by the heat sink panels, rather than by these lateral sidewalls.

A fan is associated with each such heat sink air plenum in this present embodiment, and serves to withdraw heated air from the illumination chamber. The flow path of the air is directed, in part, through the aforementioned air plenum to thereby remove and dissipate heat from the outboard side (back side) of the heat sink panel. The arrangement and configuration of the heat sinks also substantially eliminates air currents within the illumination chamber which could disturb the work being projected.

A second, and passive, heat dissipation mechanism is additionally provided which maintains the exterior of the front and back sidewalls, (i.e. the outboard side of the housing sidewalls adjacent the heat sinks), in a moderate temperature range, that is, not unpleasant to the touch. This passive heat dissipation mechanism serves to cool as well as insulate the front and back housing sidewalls, which can become hot from the heated air which is caused to pass over the interior of the front and back sidewalls through the air plenums formed with the heat sink panels.

In a present embodiment, this passive heat dissipation mechanism takes the form of a plastic panel mounted to the exterior or outboard side of the front and back housing sidewalls. The plastic panel is provided with a plurality of vertically extending elongated ribs along its inboard side which, with the adjacent sidewall, define passive air spaces or channels between the plastic panel and the exterior of the sidewall. That is, the plastic panel provides a plurality of side-by-side vertically extending air channels along the exterior of the front and back sidewalls of the projector. These channels are open both at the top and at the bottom, such that air convection through the channels cools the sidewall exterior. The plastic also serves as thermal insulation for the outside of these housing sidewalls.

The fans used to exhaust air from the illumination chamber of the projector are also used to cool sets of lamps which serve as the light source. The fans are located immediately above the lamps in the compact arrangement of the foregoing embodiment. The proximity of the fans to the lamps subjects them to undesirable direct heating from the lamps.

Yet another heat dissipation mechanism is thus provided which absorbs and dissipates the heat from the lamps in the immediately vicinity of the fans. This takes the form of a disk-shaped heat shield which is mounted spaced from the bottom of the fan and in an air gap between the fan and the adjacent lamps. This shield deflects as well as absorbs a substantial portion of the heat generated by the lamps which would otherwise be transferred to the fans. Heat absorbed by the fan heat shields is dissipated by air flow around the shields, as well as by conduction to the projector housing.

These as well as other features and advantages of the present invention will be further understood with reference to the following detailed description of the invention taken in conjunction with the accompanying drawings, in which:

DETAILED DESCRIPTION OF THE INVENTION

General Structure of the Projector

As previously indicated, the present invention constitutes an improvement upon the compact, portable and lightweight opaque projectors particularly shown in U.S. Pat. No. 4,468,105 and pending U.S. pat. app. Ser. No. 704,398 (the latter disclosure being incorporated by reference herein). While the following detailed description of an embodiment of the invention is taken in regard to such an opaque projector, it will be understood that the present invention is not necessarily so limited in application, but may find utility in other image projection systems where it is desired to dissipate heat from an enclosed illumination chamber in a controlled manner.

Figure 1:
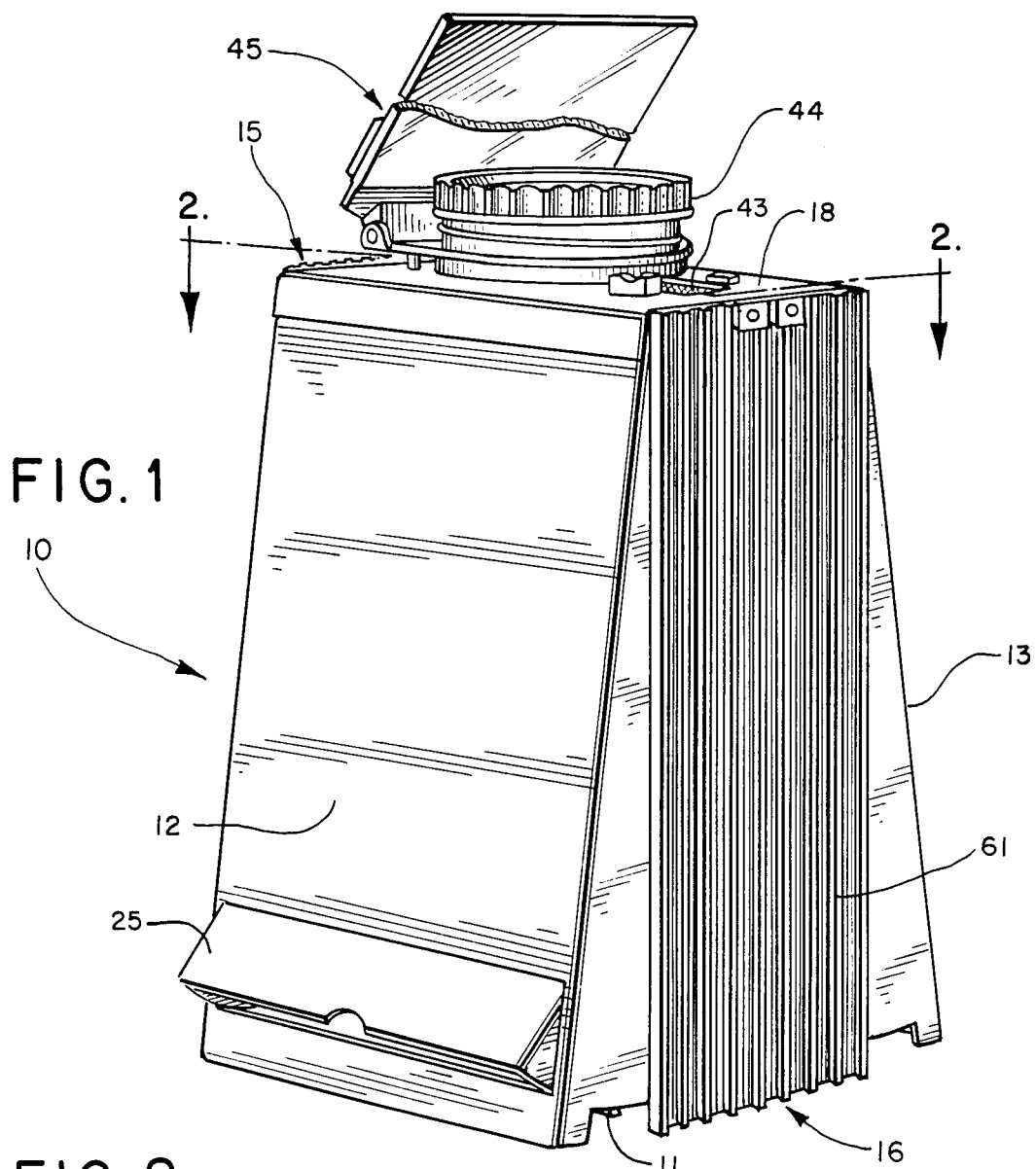
FIG. 1 is a perspective view of an opaque projector embodying the thermal management system of this invention.
Figure 2:
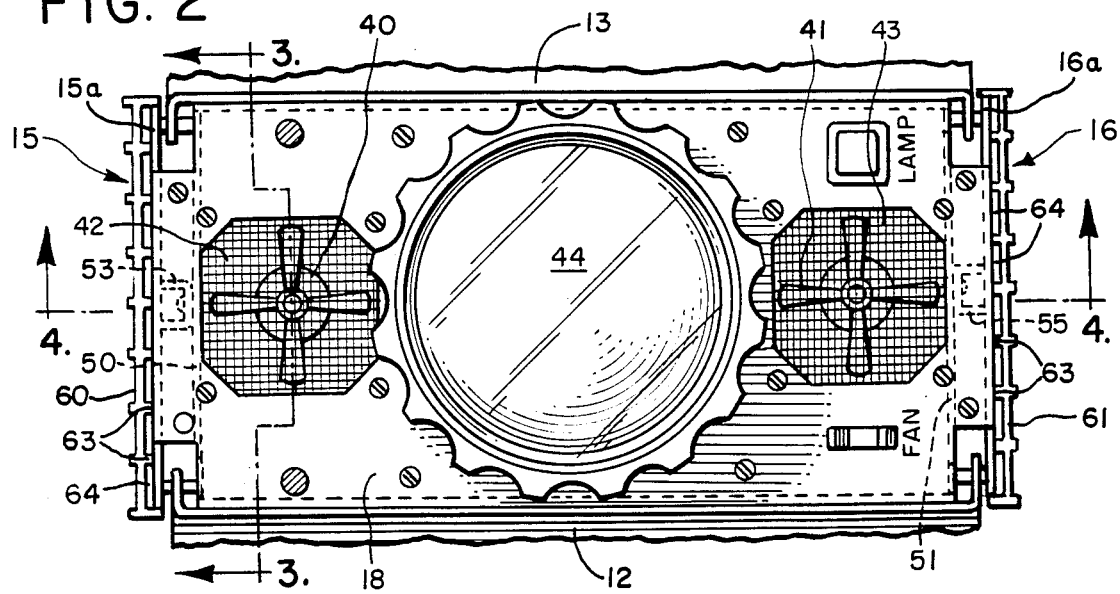
FIG. 2 is a cross-sectional view of the projector taken along line 2—2 of FIG. 1.

Referring to FIG. 1, the opaque projector 10 is shown in an open (operation mode) configuration. The projector has a rectangular base 11, a pair of lateral side panels or sidewalls 12, 13 (which extend generally perpendicularly to the plane of the base 11 when in a closed configuration), a rear or back side 15, a front side 16, and a top panel 18. The structural housing for the projector 10, which is formed of sheet aluminum, is essentially comprised of the base 11, top panel 18, lateral sidewalls 12, 13 and a back sidewall 15a and front sidewall 16a (FIG. 2). This structural housing for the projector generally defines an illumination chamber 20 therein.

When closed (transport mode), the projector has a rectangular box shape, and is of a compact size having a vertical height of about twenty inches, a length (front to back) of about fifteen inches, and a width (side to side) of about eight and a half inches. The side panels 12, 13 are pivotally connected to the top 18 of the projector to permit the panels to be pivoted between closed and open positions.

Figure 3:
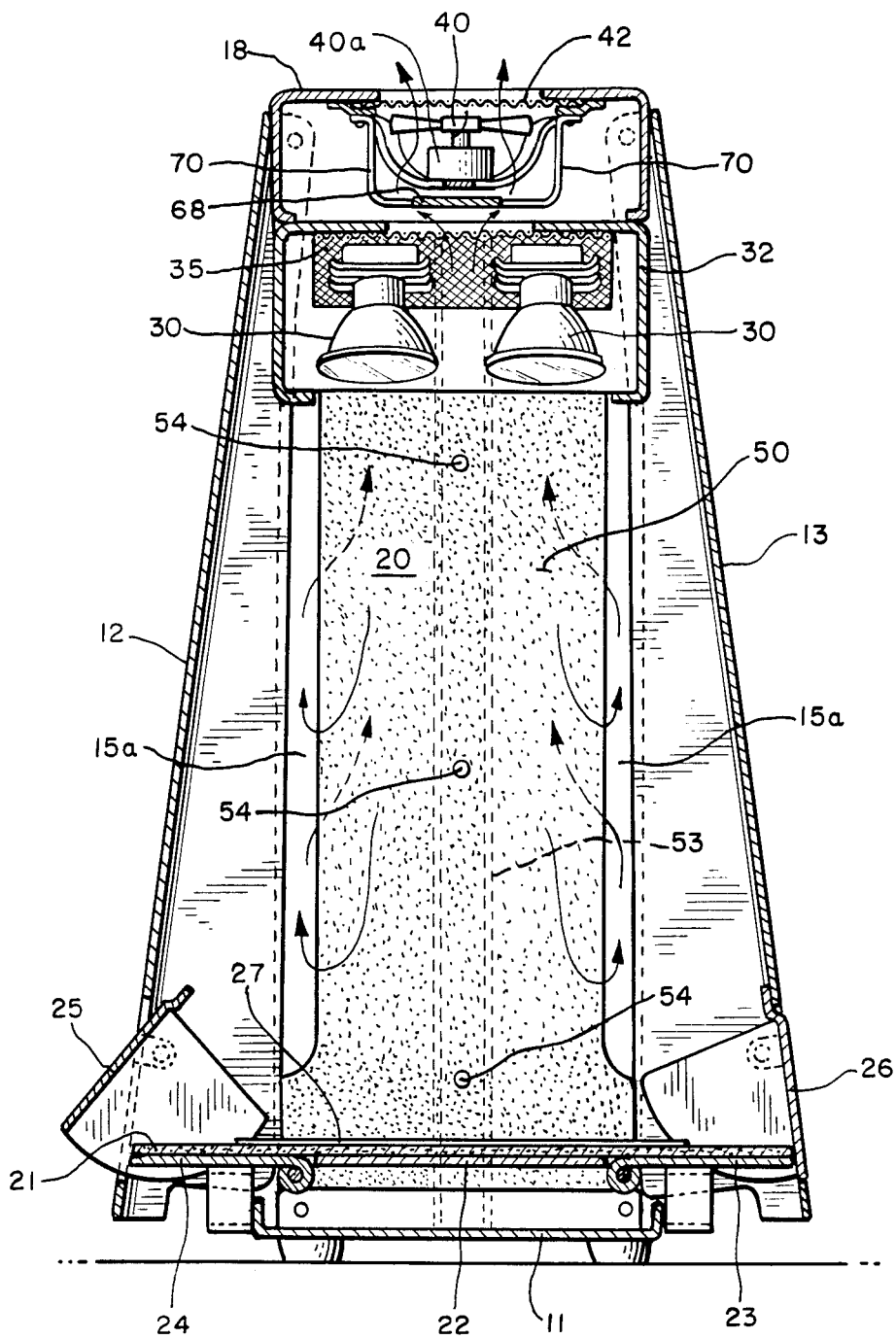
FIG. 3 is a cross-sectional view of the projector taken along line 3—3 of FIG. 2.

As shown in FIG. 3, the projector 10 includes a graphic platen 22 which is located above the base 11. The platen 22 includes two platen extension members 23, 24 which are connected by hinges to respective lateral sides of the platen 22. The platen 22 and its extension members are covered with a dark colored fabric layer 21.

In the operation mode, these extension members 23, 24 are folded down (i.e., outwardly) to thereby increase the effective size of the graphic platen. It will be noted that the side panels 12, 13 pivot outwardly to accommodate this increased platen surface, while still serving to enclose the interior 20 of the projector.

In use, access to the platen 22 to place a graphic 27 thereon, for example, is obtained through access panels 25, 26 which are provided in side panels 12, 13, respectively, proximate the platen. These access panels 25, 26 are hinged to open outwardly, such that they can be raised to gain access to the platen 22, and then closed to prevent light from escaping from the projector interior.

The light source for illuminating a graphic placed on the platen 22 comprises a plurality of lamps 30, such as General Electric ENX360W, 82V lamps. Four lamps are used herein which are arranged in sets of two lamps. The sets of lamps 30 are mounted proximate the joint between the top 18 of the projector and the front and rear sidewalls 15a, 16a (FIGS. 3 and 4) in respective lamp housings 32, 33 made of sheet metal. The bottom of each of the housings 32, 33 is open to permit the lamps 30 to shine onto the graphic platen 22. It will be noted that the lamps 30 are slightly angled (FIG. 4) to better focus the light onto the platten's surface, with less spill toward the adjacent sidewall 15a, 16a. The general illumination pattern for the lamps is diagrammatically illustrated by the straight broken arrows.

The lamp housings 32, 33 also have an outboard facing opening 35, 36, respectively, for air circulation through the lamp housing in a manner which will be described in further detail hereinafter. It will, however, be noted that airflow about the lamps 30 is from air drawn through the lower openings in the lamp housings as well as through outboard openings 35, 36. This air flow is generated by fans 40, 41.

Fans 40, 41 are mounted in the top 18 of the projector immediately above the lamps 30, with one fan used in connection with each set of lamps. The fans 40, 41 serve to withdraw heated air from the illumination chamber 20 of the projector as well as from the immediate vicinity of the lamps, where it is then exhausted to atmosphere through vents 42, 43 provided in the top 18 of the projector housing. A Sprite Fan available from Rotron, Inc. of Woodstock, N.Y. is used herein for each of the fans 40, 41.

Light from the lamps 30 illuminates the graphic 27 on the graphic platen 22. The image of the illuminated graphic is then magnified by projection lens 44, which projects the light upwardly to a reflecting mirror structure 45, which in turn reflects the image to a receiving surface, such as a screen, for viewing. The mirror structure 45 is removably mounted to the top 18 of the projector, and its structure and manner of mounting are more particularly described in the aforementioned patent application Ser. No. 704,398. In this regard, it will be understood that reference can be made to that application, as well as U.S. Pat. No. 4,468,105, for further and more specific detail concerning the general structure and operation of the opaque projector of this particular embodiment.

The Thermal Management System

As previously noted, an enclosed interior illumination chamber 20 is generally defined within the projector housing by the front and rear sidewalls 15a, 16a, side panels 12, 13, base 11 and top 18. When the projector is operated, a fairly substantial amount of heat is generated by the lamps 30 in the form of heat generated directly by the lamps (e.g., resistive heating of the lamps) as well as from the light energy which is absorbed by the interior of the housing. It is the objective of this invention to dissipate this heat in a controlled manner which neither disturbs the graphic being displayed, nor renders the projector housing uncomfortable to the touch.

Figure 4:
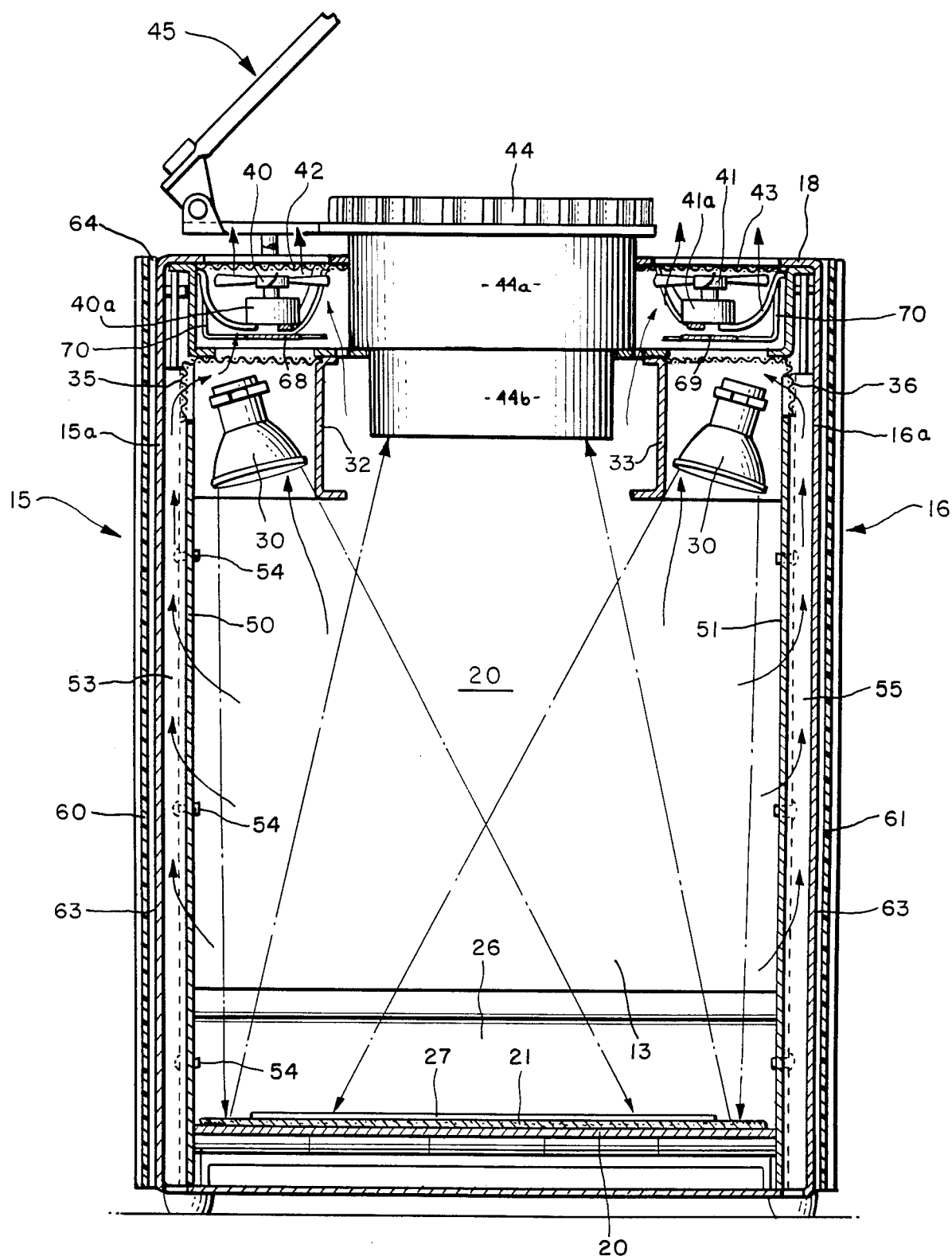
FIG. 4 is a cross-sectional view of the projector taken along line 4—4 of FIG. 2, with the air and light paths diagrammatically illustrated.

With reference to FIGS. 3 and 4, heat dissipation within the interior chamber 20 is primarily effected through the use of a pair of air cooled heat sinks 50, 51. The heat sinks 50, 51 comprise thin sheet aluminum panels that are coated with a flat black anodized finish which is highly absorptive of infrared and visible radiation. Heat sink panel 50 is mounted to the inboard side of rear sidewall 15a by fixing it with screws 54 to a channel member 53. The channel member 53 is located approximately in the middle of the back sidewall and extends generally vertically along substantially its entire length.

The channel member 53 serves to space the heat sink panel 50 approximately ⅜ of an inch from the adjacent rear sidewall 15a. This forms an air channel or air plenum between the heat sink panel 50 and back sidewall 15a; this plenum is effectively divided by the channel member 53. It will be noted that this air plenum formed between the heat sink panel 50 and the back sidewall 15a is laterally open to permit the free movement of air from the interior illumination chamber 20 around the backside of the heat sink 50 to dissipate heat from the heat sink, as detailed below. The lateral sides of the heat sink panel 50 are slightly indented along a substantial portion of its height to ensure this free flow of air.

It will be understood that heat sink panel 51 is substantially identical to heat sink panel 50, and is mounted to front sidewall 16a in a like manner through the use of a channel member 55. Also, the channel members 53, 55 serve a dual function as conduits for electrical wiring used in the projector.

Heat generated by the lamps 30 within the illumination chamber 20, by both the air heated by the lamps as well as from the radiation from the lamps, is preferentially absorbed by heat sinks 50, 51 rather than by the projector housing. Heat is removed and dissipated from the heat sink panels 50, 51 by air cooling of the back sides of the heat sinks panels 50, 51.

More specifically, the fans 40, 41 draw air through the lamp housings 32, 33 through both the lower lamp housing openings as well as the outboard openings 35, 36. As indicated by the solid arrows in FIGS. 3 and 4, air is caused to flow from the illumination chamber 20 around the lateral sides of the heat sink panels 50, 51 where it then passes through the outboard lamp housing openings 35, 36, and is then exhausted through the vents 42, 43 in the top 18 of the projector. This air flow around the back sides of the heat sinks 50, 51 serves to dissipate the heat absorbed by the heat sinks, maintaining them at an acceptable temperature (i.e., around 150 to 160 degrees). This in turn maintains the temperature of the illumination chamber 20 and the projector 10 as a whole within acceptable operating limits. Formation of this open-sided extended air plenum with the heat sinks 50, 51 also does not disturb the graphic placed on the graphic platen 22. That is, the airflow previously described is gentle enough to obviate need of any anchor or the like for the graphic, even in a compact opaque projector such as this.

The function of the heat sinks 50, 51 is further enhanced by coating the interior of the side panels/sidewalls 12, 13 with a matte finish reflective surface. As a result, much of the incident radiation on these side panels is reflected back into the chamber 20, where it can be absorbed by the heat sinks 50, 51. This serves to prevent the side panels 12, 13 from becoming objectionably warm during operation. It further permits the use of a thin single sheet of aluminum for these side panels 12, 13 without need for additional cooling means or insulation for these side panels, contributing to the light weight structure of the projector. At the same time, the matte finish prevents strong extraneous reflections which would interfere with the image projecting capability of the projector. The side panel finish, therefore, works in conjunction with the heat sinks 50, 51 to keep the projector housing at a manageable temperature.

It will be further noted that the fans 40, 41 draw heated air from the vicinity of the bottom of lens 44 thereby preventing heated air from collecting in this area. In this regard, lens 44 has a tubular plastic housing 44a within which the main lens structure 44b is carried in threaded engagement (lens structure 44b being screwed in or out of the tubular housing to focus the projected image). The tubular housing 44a is fixed to a lens support plate 46, which in turn is fixed to the projector housing. Elongated arcuate shaped cut-outs (not shown) are provided in the support plate 46 around the lens 44 through which air is drawn by the fans and then exhausted.

In its preferred form, the projector 10 also includes a passive air cooling system for the exterior or outboard sides of the front and rear sidewalls 15a, 16a. This comprises a pair of rigid plastic panels 60, 61 which respectively cover substantially all of the outboard sides of the front and back sidewalls 15a, 16a. An ABS plastic commonly available has been used herein for the panels 60, 61, which are formed by extrusion.

The inboard facing surface of each plastic panel 60, 61 is provided with a plurality of vertically extending ribs 63 (best seen in FIG. 2) which are laterally spaced apart across the panel. These ribs 63 serve to space the main portion of the panel 60, 61 about 3/32 of an inch away from the exterior (outboard) surface of the respective adjacent sidewall 15a, 16a.

The ribs 63 define passive air spaces or channels 64 between the outboard side of the front and rear sidewalls 15a, 16a and the main portion of the plastic panels 60, 61. It will be understood that the front and rear sidewalls 15a, 16a become warm during operation by virtue of heat conduction through the aluminum housing, as well as from the heated air which circulates through the plenum formed between the heat sink panels 50, 51 and the inboard side of the front and rear sidewalls 15a, 16a. Air in the channels 64 heated by the front and rear sidewalls 15a, 16a rises out of the open upper end of the channels 64, with cooler air entering the open lower end of the channels. This provides convective cooling for the outboard side of the front and rear sidewalls 15a, 16a.

The plastic panels 60, 61 further provide a degree of thermal insulation for the exterior of the sidewalls 15, 16. A combination of this passive cooling and the insulative feature of the plastic panels 60, 61 serves to maintain the exterior of the sidewalls 60, 61 within a temperature range which is not uncomfortable to the touch during operation.

In making the projector 10 as compact as possible, the fans 40, 41 are located adjacent and directly above a respective set of lamps 30 in this embodiment. Because of the proximity of the fans 40, 41 to the lamps, a certain amount of direct heat transfer can occur from the lamps to the fans, and particularly the fan motors 40a, 41a, which can impede the operation of the fans and reduce fan life. To prevent this direct heat transfer to the fan motors 40a, 41a, a disk-shaped heat shields 68, 69 (FIGS. 3 and 4) are mounted in the air gap between the bottom of a respective fan 40, 41 and the tops (or fixtures) of the adjacent lamps. The disks 68, 69 are stamped from thin sheet aluminum in a diameter about equal to that of the fan motor, and have a pair of bent ears or brackets 70 which extend from opposite sides of the disk. The brackets 70 are fixed by screws to the frame/housing of a respective fan, with a disk 68, 69 suspended beneath the respective fan motor 40a, 41a the manner described. An air gap of about ½ of an inch between the disk and the fan motor bottom is used herein.

The disk heat shields 68, 69 serve to absorb a substantial portion of the direct heat from the lamps 30, with the disks being cooled by heat dissipation through conduction to the projector housing, as well as by the airflow around the disks caused by the fans.

It will thus be seen from the foregoing that a thermal management system for a compact, lightweight opaque projector is provided primarily through the use of specialized air cooled heat sinks adjacent the front and back sidewalls 15a, 16a of the enclosed interior illumination chamber 20, which absorb and dissipate the majority of the heat generated by the lamps 30 in this chamber in a controlled fashion. The controlled dissipation is achieved by causing air to flow from the interior chamber through an air plenum formed between the back sides of the heat sink panels 50, 51 and the adjacent sidewall; which draws heat from the heat sinks and exhausts it out of the top of the projector. The side panels 12, 13 of the projector are further covered with a matte finish to direct stray radiation from the lamps onto the heat sinks for absorption and dissipation.

Operating in conjunction with the heat sinks 50, 51 are passive air channels 64 formed by plastic panels 60, 61 mounted on the outboard sides of the front and back sidewalls, which serve to provide a cooling convective flow of air over the exterior of the sidewalls 15a, 16a. The plastic panels 60, 61 also thermally insulate these portions of the projector. Disk heat shields 68, 69 are additionally provided to deflect and dissipate direct heat transfer which would otherwise occur from the lamps 30 to the adjacent fans 40, 41.

Thus, while one embodiment of the present invention in a thermal management system for an opaque projector has been described herein, modifications of structure, elements, materials, components and the like will be recognized by, those skilled in the art without departing from the scope of the invention claimed herein, and all such modifications, refinements and the like are intended to be covered by the following claims.

We claim:

1. In an opaque projector having a housing, an interior illumination chamber defined within the housing by a top, a base, and generally vertically extending sidewalls including a front wall, a back wall, and a pair of lateral sidewalls, a light source for illuminating an object placed within the illumination chamber, the light source generating heat and heated air within the illumination chamber when in use, the improvement in a thermal management system for the projector comprising:

lamps mounted adjacent the top of the projector, said lamps comprising said light source and being generally aimed toward the base, heat sink panels for absorbing heat generated by the light source within the illumination chamber, said heat sink panels mounted within the illumination chamber and in spaced relation to respective opposed sidewalls, each heat sink panel defining an air plenum between said heat sink panel and its respective sidewall, each said air plenum being open to said illumination chamber, said heat sink panels being respectively mounted in spaced relation to said front and back walls, said heat sink panels extending along substantially the entire inboard facing surface of said front and back walls, each said air plenum being open to said illumination chamber along at least one vertically extending side of a respective heat sink panel and fan means for exhausting heated air from the illumination chamber, said fan means being mounted on the housing and drawing air through said air plenums to cool said heat sink panels.

2. The improved opaque projector of claim 1 wherein only said two heat sink panels mounted in spaced relation to said front and back walls are used, each said heat sink panel comprising a planar sheet of metal having a light absorbtive inboard-facing surface, each said plenum being open to said illumination chamber along two vertically extending sides of a respective heat sink panel.

3. The improved opaque projector of claim 2 wherein said fan means comprises a pair of fans, each fan communicating with an upper portion of a respective air plenum to draw air through said air plenum, said fans also drawing air from the illumination chamber around respective lamps to cool said lamps.

4. The improved opaque projector of claim 2 wherein the lateral sidewalls each have a light reflective inboard facing surface to reflect stray light back into the illumination chamber for useful illumination or absorption by said heat sink panels.

5. In an opaque projector having a housing, an interior illumination chamber defined within the housing by a top, a base, and generally vertically extending sidewalls including a front wall, a back wall, and a pair of lateral sidewalls, a light source for illuminating an object placed within the illumination chamber, the light source generating heat and heated air within the illumination chamber when in use, the improvement in a thermal management system for the projector comprising:

lamps mounted adjacent the top of the projector, said lamps comprising said light source and being generally aimed toward the base, two heat sink panels for absorbing heat generated by the light source within the illumination chamber, said heat sink panels mounted in spaced relation to said front and back walls within the illumination chamber, each said heat sink panel comprising a planar sheet of metal having a light absorptive inboard-facing surface, each heat sink panel defining an air plenum between said heat sink panel and its respective sidewall, each said plenum being open to said illumination chamber along two vertically extending sides of a respective heat sink panel, a pair of fans mounted on the housing, each fan communicating with an upper portion of a respective air plenum to draw air through said air plenum to cool said heat sink panels, said fans also drawing air from the illumination chamber around respective lamps to cool said lamps, said fans being located in proximity to a respective lamp, and a heat shield plate mounted in spaced relation between each fan and a respective lamp for absorbing and deflecting heat from said lamps.

6. In an opaque projector having a housing, an interior illumination chamber defined within the housing by a top, a base, and generally vertically extending sidewalls including a front wall, a back wall, and a pair of lateral sidewalls, a light source for illuminating an object placed within the illumination chamber, the light source generating heat and heated air within the illumination chamber when in use, the improvement in a thermal management system for the projector comprising:

lamps mounted adjacent the top of the projector, said lamps comprising said light source and being generally aimed toward the base, heat sink panels for absorbing heat generated by the light source within the illumination chamber, said heat sink panels mounted within the illumination chamber and in spaced relation to respective opposed sidewalls, each heat sink panel defining an air plenum between said heat sink panel and its respective sidewall, each said air plenum being open to said illumination chamber, said heat sink panels being respectively mounted in spaced relation to said front and back walls, said heat sink panels extending along substantially the entire inboard facing surface of said front and back walls, each said air plenum being open to said illumination chamber along at least one vertically extending side of a respective heat sink panel, and fan means for exhausting heated air from the illumination chamber, said fan means being mounted on the housing and drawing air through said air plenums to cool said heat sink panels, and a pair of exterior panels substantially covering the outboard sides of said front and back walls, each said exterior panel being mounted in spaced relation to a respective front and back wall, and having inboard extending lateral side portions which form a passive air plenum with a respective front and back wall, each said passive air plenum being closed along its lateral sides and open at its top and bottom for convective airflow through said passive air plenum for cooling of said front and back walls.

7. The improved opaque projector of claim 6 wherein said exterior panels are made of a thermally insulative material, each exterior panel further having a plurality of vertically extending ribs spaced across the inboard facing side of said exterior panel and defining a plurality of vertical air channels within said passive air plenum.

8. In an opaque projector having a housing with a plurality of walls, an interior chamber defined within the walls which is generally enclosed when the projector is in use, a light source located within the chamber for illuminating an object to be projected when such object is placed within the chamber, the light source generating heat when in use, the improvement in a thermal management system for the projector comprising:

heat sink means for absorbing heat generated by the light source, said heat sink means located within the chamber and in spaced relation to a wall to thereby define an air channel between said heat sink means and said wall, said heat sink means having a front side and a back side, said front side facing inboard, fan means for exhausting heated air from the interior space, said fan means being mounted on the housing and serving to draw air through said air channel to thereby carry off heat from said back side of said heat sink means, and passive air cooling means for said wall, said passive air cooling means including a panel outboard and in spaced relation to said wall, said panel having side portions which engage said wall to define an air plenum which is substantially closed along its lateral sides with said wall and open at its top to define an air plenum through which air heated by said wall can flow to thereby cool said wall by convective air cooling.

9. The improved opaque projector of claim 8 wherein the housing walls include a top, a base and generally vertically extending front, back and lateral sidewalls, said heat sink means comprising a pair of heat sink panels respectively mounted in spaced relation to said front and back walls to define respective air channels with said front and back walls, said heat sink panels extending along substantially the entire inboard surface of said front and back walls with a respective air channel extending along substantially the entire back side of its associated heat sink panel, each said air channel being open to said chamber along at least one vertically extending side of a respective heat sink panel.

10. The improved opaque projector of claim 9 wherein each said heat sink panel comprises a planar sheet of heat conducting material having a light absorptive front side, each said air channel being open to said illumination chamber along two vertically extending sides of a respective heat sink panel, said light source comprising lamps mounted at the top of the projector and adjacent said front and back walls, said lamps being generally aimed toward said base, and wherein said lateral sidewalls have a light reflective inboard-facing surface to reflect stray light back into the illumination chamber for useful illumination or absorption by said heat sink panels.

11. The improved opaque projector of claim 10 wherein said passive air cooling means comprises a pair of exterior panels substantially covering the outboard sides of said front and back walls, each said exterior panel being mounted in spaced relation to a respective front and back wall, each panel being made of a thermally insulative material and having a plurality of vertically extending ribs spaced across the inboard-facing side of said exterior panel and defining a plurality of vertical air channels within each said air plenum.

12. The improved opaque projector of claim 10 wherein said fan means comprises a pair of fans, each fan communicating with an upper portion of a respective heat sink air channel to draw air through said air channel, said fans also serving to draw air from the chamber and around a respective lamp to cool said lamps, said fans being located in proximity to a respective lamp, and further including a heat shield plate mounted in spaced relation between each fan and respective lamp for absorbing and deflecting heat from said lamps.

13. In an opaque projector having a housing, an interior illumination chamber defined within the housing by a top, a base and generally vertically extending sidewalls including a front wall, a back wall and a pair of lateral sidewalls, lamps mounted adjacent said front and back walls in an upper portion of the chamber for illuminating an object placed within the chamber, the lamps generating heat and heated air within the chamber when in use, the improvement in a thermal management system for the projector comprising:

a solitary pair of heat sink panels respectively mounted in spaced relation to said front and back walls, each said sink panel extending along substantially the entire inboard-facing surface of said front and back walls, each heat sink panel defining an air plenum between said heat sink panel and said respective front and back wall, each said air plenum being open to said illumination chamber along two vertically extending sides of a respective heat sink panel, each said heat sink panel having a light absorptive inboard-facing surface, said lateral sidewalls having a light reflective inboard-facing surface to reflect stray light back into the illumination chamber for useful illumination or absorption by said heat sink panels, a pair of fans, each fan communicating with an upper portion of a respective air plenum to draw air through said air plenum and thereby cool the outboard side of an associated heat sink panel, said fans also drawing air from the illumination chamber and around a respective lamp to cool said lamps, each said fan being located in proximity to a respective lamp, a pair of heat shield plates, each heat shield plate mounted in spaced relation between a fan and a respective lamp for absorbing and deflecting heat from said lamps, and a pair of exterior panels substantially covering the outboard sides of said front and back walls, each said exterior panel being mounted in spaced relation to a respective front and back wall and having a plurality of vertically extending ribs spaced across the inboard-facing side of said exterior panel and defining a plurality of vertical air channels within said passive air plenum which are open at the top and bottom for convective airflow through said air channels for cooling of said front and back walls, said exterior panels further being made of a thermally insulative material.

14. In an opaque projector having a housing, an interior illumination chamber defined within the housing by a top, a base, and generally vertically extending sidewalls including a front wall, a back wall, and a pair of lateral sidewalls, a light source for illuminating an object placed within the illumination chamber, the light source generating heat and heated air within the illumination chamber when in use, the improvement in a thermal management system for the projector comprising:

lamps mounted adjacent the top of the projector, said lamps comprising said light source and being generally aimed toward the base, heat sink panels for absorbing heat generated by the light source within the illumination chamber, said heat sink panels mounted within the illumination chamber and in spaced relation to respective opposed sidewalls, each heat sink panel defining an air plenum between said heat sink panel and its respective sidewall, each said air plenum being open to said illumination chamber, said heat sink panels being respectively mounted in spaced relation to said front and back walls, said heat sink panels extending along substantially the entire inboard facing surface of said front and back walls, each said air plenum being open to said illumination chamber along at least one vertically extending side of a respective heat sink panel, fans for exhausting heated air from the illumination chamber, said fans being mounted on the housing and drawing air through said air plenums to cool said heat sink panels, and a fan being located in proximity to a respective lamp, and a heat shield plate mounted in spaced relation between each fan and a respective lamp for absorbing and deflecting heat from said lamps.

* * * * *